Patented Sept. 6, 1938

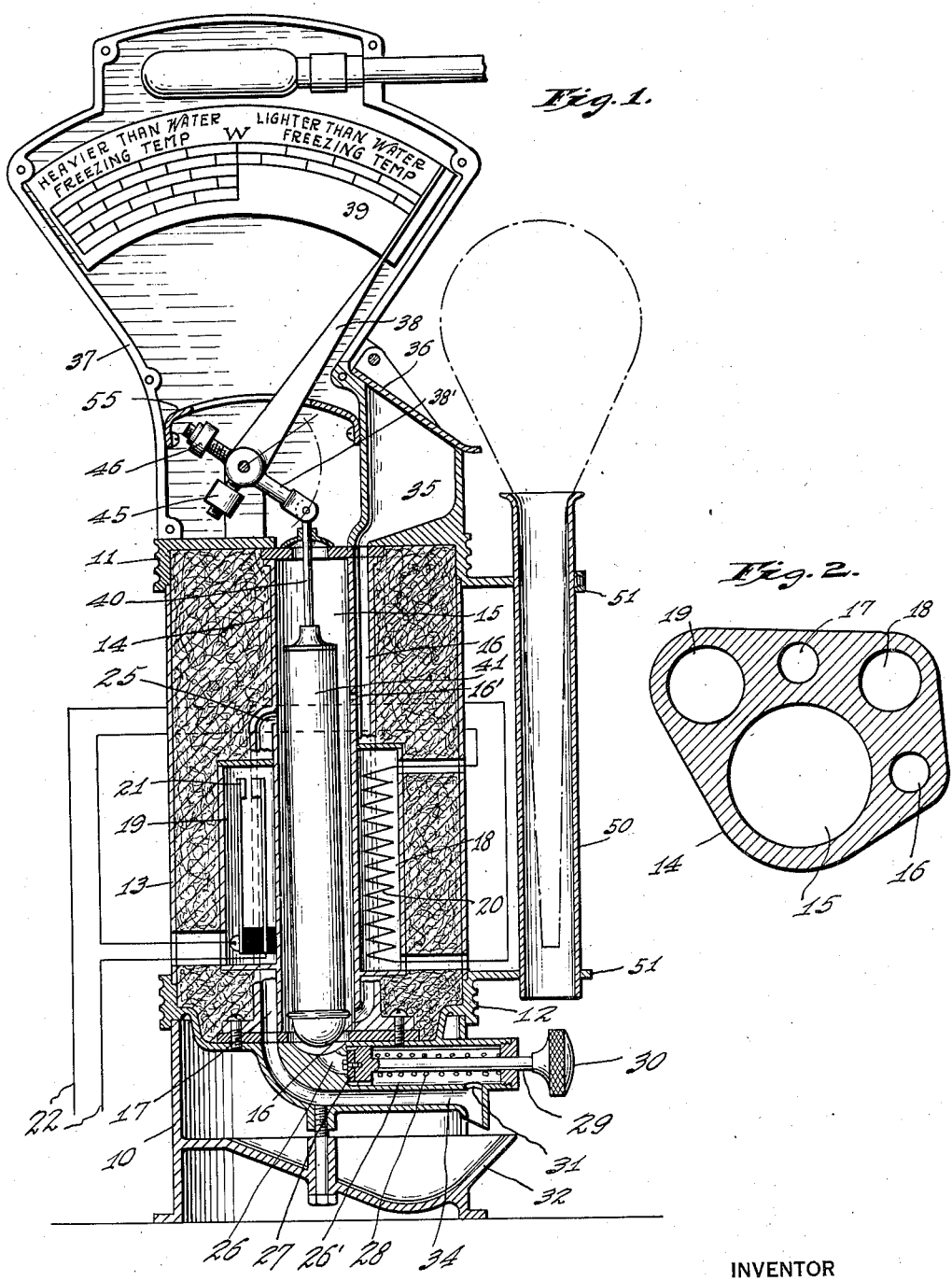

2,129,617

UNITED STATES PATENT OFFICE 2,129,617

INDICATING HYDROMETER

Robert H. Hill, Anderson, Ind., assignor to Warner Machine Products, Inc., Muncie, Ind., a corporation of Indiana Application April 6, 1936, Serial No. 72,963

9 Claims. (Cl. 265—45)

This application is a continuation in part of my copending application Serial No. 41,719, filed September 23, 1935.

It is the object of my invention to produce an indicating hydrometer and one primarily suited for use in indicating the freezing point of solutions used in the cooling systems of automobile engines. More specifically, it is my object to produce a device of this kind which will indicate the freezing temperature directly and accurately and which will make it unnecessary for the operator to take account of the temperature of the solution.

In carrying out my invention I provide a float chamber in which there is a float operatively connected to indicating mechanism, such as an indicating hand moving over a suitably graduated dial. The float chamber is provided at a predetermined elevation with an outlet port and also with an inlet passage. The inlet passage, the float, and the float chamber are so shaped as to provide a relatively large surface area in contact with the solution; and those parts of the device which come into contact with the solution are maintained at a substantially constant predetermined temperature by heat from a suitable heat-source. The parts of the device are so constructed and arranged as to minimize the effect of friction on the accuracy of the reading obtained; and provisions are made so that all moving parts of the device which come into contact with the liquid being tested or with vapors therefrom will receive heat from the heat-source employed to maintain constant the temperature of the liquid-receiving portion of the device.

The accompanying drawing illustrates my invention: Fig. 1 is a vertical section through the device somewhat idealized by the rotation of certain portions thereof into the plane of the section; and Fig. 2 is a horizontal section through the body of the device.

The device illustrated in the drawing comprises a base 10 supporting a casing consisting of upper and lower heads 11 and 12 and a shell 13 extending between such heads. Also extending between the heads is a centrally disposed body 14, preferably in the form of a metal casting. The body 14 is provided with a float chamber 15, an inlet passage 16, an outlet passage 17, and two cylindrical cavities 18 and 19 for the reception respectively of an electrical resistance-type heating element 20 and a temperature-responsive switch 21 controlling the supply of electrical current to the heating element 20 from a supply line 22.

The float chamber 15 is shown as extending completely through the body 14 and opening into the upper and lower faces thereof. The inlet passage 16 extends from the upper face of the body downwardly therethrough, and communicates with the chamber 15 close to the lower end thereof. The outlet passage 17 communicates with the chamber 15 through a port 25 in the side wall of the chamber and extends downwardly through the body to the lower face thereof.

The lower head 12 of the casing is provided with a passage 26 opening into the upper face of the head in line with the chamber 15 and communicating with a horizontal cavity 26'. Communication between the passage 26 and cavity 26' is normally prevented by means of a valve 27 biased toward closed position as by means of a compression spring 28. The valve 27 is provided with a stem 29 which extends outwardly through the closed end of the cavity 26' and is there provided with a suitable knob or handle 30 by means of which the valve 27 can be opened. Near the front end of the cavity 26', there is a discharge opening 31 which may conveniently be disposed over a basin 32 formed in the base 10.

In addition to the passage 26, the lower head 12 may also be provided with a passage 34 opening into the upper face of the base in line with the discharge passage 17 in the body 14 and discharging into the basin 32, preferably at the front of the device.

The upper head 11 is shown as provided with a reservoir 35 communicating with the inlet passage 16 of the body 14 and having its upper end normally closed by a cover 36. Supported from the head 11, as by being integral therewith, is a housing 37 containing a movable pointer 38 the outer end of which swings over a graduated dial 39 which is also mounted within the housing 37. The pointer 38 has a laterally projecting arm 38' operatively connected, as by means of a rod 40, to a float 41 positioned within the float-chamber 15. As indicated in the drawing, the pointer 38 is several times as long as the distance between its axis and its point of connection to the rod 40 in order to make movement of the float more readily apparent.

Associated with the hand 38 is suitable counterbalancing means, preferably in the form of two radially adjustable weights 45 and 46. The weight 45 is located diametrically opposite the hand 38 and has for its primary purpose the balancing of such hand. The weight 46 is shown as located diametrically opposite the arm 38' and is provided to insure that the arm 38' will exert an upward force on the rod 40 under all conditions when liquid is being tested. I find that the accuracy of the reading obtained from the device is very apt to be adversely affected, if the indicating mechanism exerts a downward force on the float; for, under such circumstances, the float will bear against the side wall of the float chamber where it will be subjected to friction which I have found to be great enough to prevent an accurate reading.

When my device is to be used, it is supported in the desired position and leveled, and the wires 22 are connected to any convenient source of electric current. The heating element 20 will then operate under the control of the temperature-responsive switch 21 to maintain the body 14 at a substantially constant temperature. The space between the body 14 and the shell 13 may be filled with insulating material to decrease heat losses.

When it is desired to determine the freezing point of a given solution, the solution is introduced into the reservoir 35 in quantity sufficient to fill the float chamber. On its way to the float chamber, the solution passes through the inlet passage 16 for the entire length thereof and is introduced into the float chamber at the bottom, rising in the float chamber to the discharge port 25 through which any excess passes into the discharge passage 17—34. Discharge of fluid from the passage 34, the outlet of which is located at the front of the device where it is visible, apprises the operator that the float chamber is full. The passage 16 is intentionally made of relatively small cross-sectional area. This not only increases the ratio between the surface area of fluid in contact with the body 14 and the quantity of fluid, but it also retards the fluid; and these two features co-operate to aid in bringing the fluid to the temperature of the body 14 before it fills the float chamber. For the same reason, and also to lessen the quantity of fluid required in making the test, the float 41 is made cylindrical in form and of only slightly smaller diameter than the float chamber.

Fluid is introduced into the reservoir 35 at the top of the device until some escapes from the passage 34 in the lower head to indicate that the float chamber is filled to the port 25. As the port 25 has a fixed position, the level of the fluid in the float chamber is always constant during this test. The position of the float relative to the level of fluid in the chamber will depend upon the density of the fluid, and the position of the float will in turn determine the position of the pointer on the dial 39. Conveniently, there are several scales on the dial 39, each scale being for use with one of the common freezing point depressants used in the cooling systems of automobile engines.

After a sufficient quantity of fluid has been introduced into the reservoir 35 to overflow through the passages 17 and 34, the operator watches the hand 38; and if the hand is stationary, its position on the scale corresponding to the character of the fluid being tested will indicate the freezing point of that fluid. If the temperature of the fluid at the time of its introduction is materially different from that at which the body 14 is maintained, a short time interval may be required to bring the fluid in the float chamber to the proper temperature. If this should be the case, the hand 38 will not immediately come to rest; but instead, will gradually move over the dial 39 until the fluid in the float chamber is brought to the temperature of the body 14. To obtain an accurate determination of the freezing point, therefore, the device should not be read until the pointer 38 comes to rest.

At the completion of the reading, the valve 27 is opened to permit the fluid to escape from the float chamber into the basin 32 from which it can be withdrawn, if desired, and re-introduced into the engine cooling system.

I prefer to maintain the body 14 and those parts within it at a temperature slightly above that at which the average automobile engine operates so that fluid introduced into the device will be warmed thereby. Because of the heat-insulation surrounding the body 14, heat escapes therefrom slowly; and if the fluid to be tested were introduced at a temperature above that of the body, a relatively long time would be required for it to cool to the proper temperature for reading. Further, if the fluid is being cooled rather than warmed in the device it will contract and cause the liquid level in the chamber 15 to drop. This would require the refilling of the float chamber in order to obtain an accurate reading. A temperature in the neighborhood of 165° F. will be suitable for the device. A temperature much higher than that would involve the danger of vaporizing some of the common freezing-point depressants used in engine cooling systems.

For the purpose of withdrawing from the engine cooling system the fluid which is to be tested, a bulb syringe may be employed, and the device may be provided with a holder for such syringe. The holder illustrated in the drawing takes the form of a vertical tube 50 supported by two ears 51 projecting outwardly from the heads 11 and 12.

I find it desirable to provide a small port 16' affording communication between the inlet passage 16 and the float chamber 15, such port preferably being located slightly above the discharge port 25. In the absence of the port 16' I find that, possibly as the result of a syphoning action, the liquid will sometimes come to rest at the conclusion of the filling operation with its surface below the discharge port 25, and thus prevent the instrument from giving an accurate reading. The port 16' also has the function of preventing air locks in the passage 16 which would interfere with complete filling of the float chamber. As the diameter of the port 16' is relatively small it will not prevent the bulk of the fluid from continuing downwardly through the inlet passage 16 to enter the float chamber at the bottom.

It is contemplated that my device will be mounted in the open so as to be readily accessible, and therefore it will at times be subjected to relatively low temperatures. The heated body of the device will cause some vaporization of any liquid introduced into the float chamber; and the vapors from such liquid, rising into the relatively cooler portions of the device above the body will tend to condense and, in extremely cold weather, may even freeze. Any liquid freezing at the pivot point of the hand 38 or at the pivotal connection between the arm 38' and rod 40 will create friction interfering with an accurate reading; and liquid condensing or freezing on the glass which in practice will form the front wall of the housing 37 will obscure the scale and hand. I therefore prefer to place within the housing 37 and as close as possible above the pivot of the hand 38 a shield 55 which is slotted to permit free movement of the hand. This shield serves to retain beneath it sufficient heat to prevent freezing of liquid on the pivots beneath it, and also serves to retain a large proportion of any vapor which otherwise would rise and become deposited on the glass front of the housing 37.

I have found that after the device has been used to test a liquid of relatively high freezing point there is a tendency, in cold weather, for the valve 27 to freeze to its seat. To overcome this tendency, I arrange the seat for the valve so that it will be as close as practicable and in heat-conducting relation to the lower portion of the body 14. To this end, the valve-seat is preferably formed in the lower head 12 and that head is made of metal. Any gaskets used to prevent leakage between the body 14 and head 12 should preferably not be of any effective heat-insulating material.

I claim as my invention:

1. An indicating hydrometer, comprising a metal body having a cylindrical float chamber with thick walls, a cylindrical float of slightly smaller diameter than said chamber disposed therein, said body being provided with an inlet passage extending downwardly through the float-chamber wall and communicating with said float chamber near the bottom thereof, said float chamber being provided with a fixed overflow discharge opening, means for heating said body, a device responsive to the temperature of said body for controlling said heating means, and indicating mechanism operatively connected to said float and responsive to the vertical position thereof.

2. An indicating hydrometer, comprising a reservoir, a thick-walled float chamber located below said reservoir, a restricted inlet passage formed in said float-chamber wall connecting said reservoir with said float-chamber and communicating with said float chamber near the bottom thereof, an overflow discharge passage for said float chamber, means for heating said inlet passage and float chamber, a temperature-responsive device for controlling said heating means, a float in said float chamber, and indicating mechanism operatively connected to said float and responsive to the vertical position thereof.

3. An indicating hydrometer, comprising a metal body having a thick-walled float chamber, a float therein, said body being provided with an inlet passage formed in the float-chamber wall, extending downwardly therethrough, and communicating with said float chamber near the bottom thereof, said float chamber being provided with a fixed overflow discharge opening, means for heating said body, a device responsive to the temperature of said body for controlling said heating means, and indicating mechanism operatively connected to said float and responsive to the vertical position thereof.

4. An indicating hydrometer as set forth in claim 2 with the addition that said inlet passage and said float chamber are formed in a single metal casting, said casting being surrounded with heat-insulating material.

5. An indicating hydrometer as set forth in claim 2 with the addition that said inlet passage and said float chamber are formed in a single metal casting.

6. An indicating hydrometer as set forth in claim 3 with the addition of a shell surrounding said body, the space between said shell and body being filled with heat-insulating material.

7. An indicating hydrometer as set forth in claim 3 with the addition that said body is provided with a cavity in which said heating means is located.

8. An indicating hydrometer, comprising a metal body having a thick-walled float chamber extending vertically therethrough, upper and lower heads disposed against the top and bottom faces of said body, an inlet passage extending downwardly through the wall of said float-chamber and communicating with said float chamber near the bottom thereof, a valved discharge passage formed in said lower head and communicating with said float chamber, said float-chamber being provided with an overflow port, means for heating said body, temperature-responsive means controlling said heating means, a float in said float chamber, and indicating mechanism supported from said upper head and operatively connected to said float.

9. An indicating hydrometer, comprising a float chamber, a float therein, indicating mechanism mounted above said float chamber and including a pivotally mounted hand connected to said float, a housing for said indicating mechanism, means for heating said float chamber, and a heat-retaining shield extending across said housing immediately above the mounting of said hand and its connection to said float.

ROBERT H. HILL.